US010976794B2

(12) United States Patent
Robotham et al.

(10) Patent No.: US 10,976,794 B2
(45) Date of Patent: Apr. 13, 2021

(54) LOW LATENCY POWER SUPPLY FOR NOTIFICATION APPLIANCE SYNCHRONIZATION

(71) Applicant: Carrier Corporation, Palm Beach Gardens, FL (US)

(72) Inventors: Martin Paul Robotham, Bradenton, FL (US); Levent Taspek, Palm Beach Gardens, FL (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 326 days.

(21) Appl. No.: 16/222,294

(22) Filed: Dec. 17, 2018

(65) Prior Publication Data
US 2019/0196561 A1 Jun. 27, 2019

Related U.S. Application Data

(60) Provisional application No. 62/618,286, filed on Jan. 17, 2018, provisional application No. 62/608,939, filed on Dec. 21, 2017.

(51) Int. Cl.
| | | |
|---|---|---|
| G06F 1/30 | (2006.01) | |
| G08B 25/14 | (2006.01) | |
| H02J 7/00 | (2006.01) | |
| H02J 7/34 | (2006.01) | |
| G08B 7/06 | (2006.01) | |

(52) U.S. Cl.
CPC ............ *G06F 1/30* (2013.01); *G08B 7/06* (2013.01); *G08B 25/14* (2013.01); *H02J 7/0013* (2013.01); *H02J 7/0071* (2020.01); *H02J 7/342* (2020.01); *H02J 7/34* (2013.01)

(58) Field of Classification Search
CPC ............... G06F 1/12; G06F 1/24; G06F 1/26
See application file for complete search history.

(56) References Cited

U.S. PATENT DOCUMENTS

| | | |
|---|---|---|
| 3,716,753 A | 2/1973 | Exner |
| 4,151,446 A | 4/1979 | Ludloff |
| 4,173,039 A | 10/1979 | Sun et al. |
| 4,392,088 A | 7/1983 | Hartai |
| 4,563,733 A | 1/1986 | Schlenk |

(Continued)

FOREIGN PATENT DOCUMENTS

| | | |
|---|---|---|
| DE | 1168563 | 4/1964 |
| EP | 0130254 | 1/1985 |

(Continued)

OTHER PUBLICATIONS

The Extended European Search Report for EP Application No. 18213365.2, dated Apr. 24, 2019.

*Primary Examiner* — Albert Wang
(74) *Attorney, Agent, or Firm* — Carlson, Gaskey & Olds, P.C.

(57) ABSTRACT

A power supply for a synchronized appliance is disclosed and includes a first energy store having a first energy storage capacity, a processor powered by energy from the first energy store, and a second energy store having a second energy storage capacity greater than the first energy storage capacity. The processor initiates charging of the second energy store after a delay beginning at a time of receipt of a charge of predefined level from the first energy store.

20 Claims, 2 Drawing Sheets

(56) References Cited

U.S. PATENT DOCUMENTS

| | | |
|---|---|---|
| 4,618,803 A | 10/1986 | Hardy |
| 4,687,971 A | 8/1987 | Shimizu |
| 5,117,325 A | 5/1992 | Dunk et al. |
| 5,932,976 A | 8/1999 | Maheshwari et al. |
| 6,069,805 A | 5/2000 | Anderson, Jr. |
| 6,393,220 B1 | 5/2002 | Nose et al. |
| 7,005,855 B2 | 2/2006 | Zhu et al. |
| 8,368,314 B2 | 2/2013 | Chen et al. |
| 8,390,214 B2 | 3/2013 | Van Laanen et al. |
| 8,638,575 B2 | 1/2014 | Dunipace |
| 8,975,847 B2 | 3/2015 | Kono |
| 9,325,237 B2 | 4/2016 | Ren |
| 9,426,870 B2 | 8/2016 | Falk et al. |
| 2005/0037241 A1 | 2/2005 | Schneider |
| 2011/0279096 A1 | 11/2011 | Sonntag |
| 2013/0128403 A1 | 5/2013 | Chiang |
| 2013/0141245 A1 | 6/2013 | Gadonniex et al. |
| 2013/0334963 A1 | 12/2013 | Savage, Jr. |
| 2016/0016483 A1* | 1/2016 | Yasunori ............... B60L 58/20 320/162 |

FOREIGN PATENT DOCUMENTS

| | | |
|---|---|---|
| EP | 2345309 | 7/2011 |
| JP | 2005347029 | 12/2005 |
| JP | 2006072048 | 3/2006 |
| JP | 20090186623 | 8/2009 |

\* cited by examiner

LOW LATENCY POWER SUPPLY FOR NOTIFICATION APPLIANCE SYNCHRONIZATION

CROSS-REFERENCE TO RELATED APPLICATION

This application claims benefit to U.S. Provisional Patent Application No. 62/608,939 filed on Dec. 21, 2017. This application also claims benefit to U.S. Provisional Patent Application No. 62/618,286 filed on Jan. 17, 2018.

BACKGROUND

Fire alarm and mass notification systems are used to notify the public of the presence of fire, smoke and other potentially harmful conditions. A notification appliance circuit (NAC) may be part of such a system and include many notification devices powered and controlled by a common source and control panel.

A notification appliance may include strobe lights and horns to generate warnings. Strobes and horns of each notification appliance of a NAC are synchronized in a manner determined to prevent disorientation and confusion. Synchronization may be based on signals from the NAC along with the power for each notification appliance. Synchronization of each notification appliance can be based on an initial rising edge of power provided along lines from the NAC. Variations and latency in the time between the initial rising edge of power and a synchronization reset of the notification appliance can cause corresponding variations in synchronization of the notification appliances of the NAC.

SUMMARY

A power supply for a synchronized appliance according to an exemplary embodiment of this disclosure includes among other possible things, a first energy store having a first energy storage capacity, a processor powered by energy from the first energy store, and a second energy store having a second energy storage capacity greater than the first energy storage capacity. The processor initiates charging of the second energy store after a delay beginning at a time of receipt of a charge of predefined level from the first energy store.

In a further embodiment of the foregoing synchronized appliance, a regulator receives energy from the first energy store and communicating that energy to the processor.

In a further embodiment of any of the foregoing synchronized appliances, a charge control governs charging of the second energy store.

In a further embodiment of any of the foregoing synchronized appliances, a ratio of the second energy storage capacity to the first energy storage capacity is between 10 to 1 and 1000 to 1.

In a further embodiment of any of the foregoing synchronized appliances, a ratio of the second energy storage capacity to the first energy storage capacity is between about 1000 to 1 and 10,000 to 1.

In a further embodiment of any of the foregoing synchronized appliances, the first energy store charges to the first energy storage capacity within a first time and the second energy store charges to the second energy storage capacity within a second time that is longer than the first time.

In a further embodiment of any of the foregoing synchronized appliances, the second energy storage capacity stores enough energy to operate the processor through an extended power interruption.

In a further embodiment of any of the foregoing synchronized appliances, the second energy store charges the first energy store in response to an extended power interruption.

In a further embodiment of any of the foregoing synchronized appliances, the processor governs operation of at least one of a horn and a strobe.

In another disclosed exemplary embodiment, a notification appliance circuit includes among other possible things a plurality of notification appliances, wherein at least one of the plurality of notification appliances include a power source including a first energy store having a first energy storage capacity, a processor powered by energy from the first energy store and a second energy store having a second energy storage capacity greater than the first energy storage capacity. The processor delays charging of the second energy store after a delay beginning at a time of receipt of a charge of predefined level from the first energy store and circuit wiring connected to provide electric power to each of the plurality of notification appliances and synchronize operation of the plurality of notification appliances.

In a further embodiment of the foregoing notification appliance circuit, a regulator receives energy from the first energy store and communicates that energy to the processor and a charge control controlled by the processor governs charging of the second energy store.

In a further embodiment of any of the foregoing notification appliance circuits, a ratio of the second energy storage capacity to the first energy storage capacity is between 10 to 1 and 1000 to 1.

In a further embodiment of any of the foregoing notification appliance circuits, a ratio of the second energy storage capacity to the first energy storage capacity is about 1000 to 1 and 10,000 to 1.

In a further embodiment of any of the foregoing notification appliance circuits, the first energy store charges to the first energy storage capacity within a first time and the second energy store charges to the second energy storage capacity within a second time that is longer than the first time.

In a further embodiment of any of the foregoing notification appliance circuits, the second energy storage capacity stores enough energy to operate the processor through an extended power interruption.

In a further embodiment of any of the foregoing notification appliance circuits, at least one of the notification appliances include at least one of a horn and a strobe.

In another disclosed exemplary embodiment a method of powering a notification appliance in a notification appliance circuit includes, among other possible things charging a first energy store within the notification appliance with an input current from the notification appliance circuit and charging a second energy store within the same notification appliance after a delay period beginning at a time of receipt by a processor of the notification appliance of current at a predefined level from the energy store.

In a further embodiment of the foregoing method of powering a notification appliance, includes setting a regulator start with a processor in response to the receipt of charge at the predefined level.

In a further embodiment of any of the foregoing methods of powering a notification appliance, the first energy store includes a first energy storage capacity that is charged in a first time and the second energy store includes a second energy storage capacity that charges in a second time, and the second energy storage capacity is greater than the first energy storage capacity and the second time is longer than the first time.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
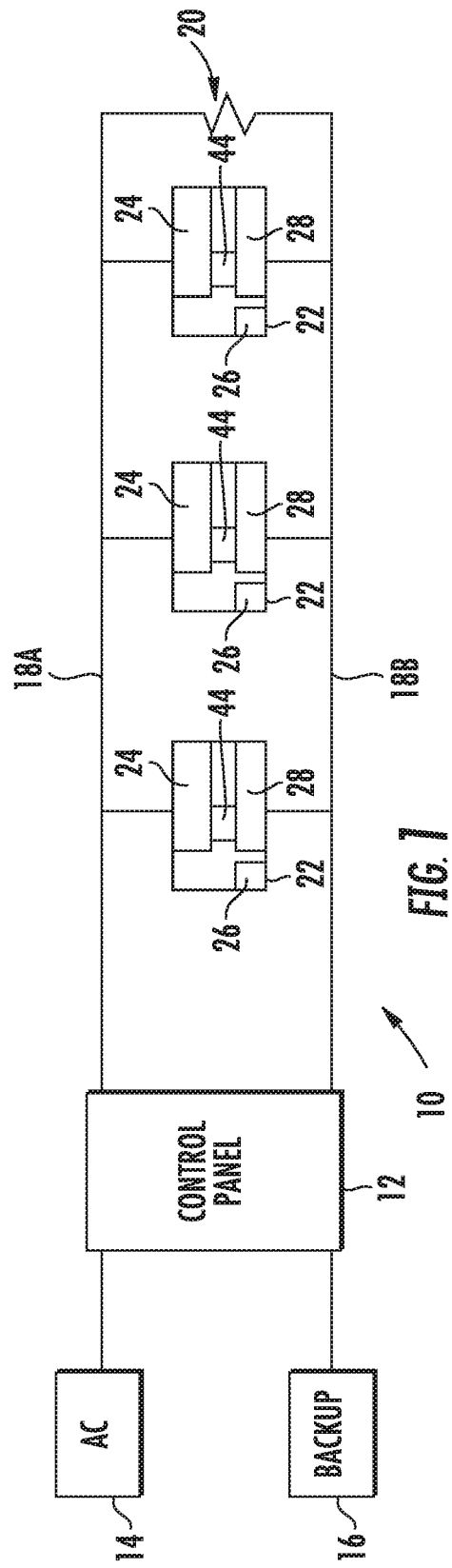
FIG. 1 is a block diagram illustrating an example notification appliance circuit (NAC).

Referring to FIG. 1, a notification appliance circuit (NAC) 10 includes a control panel 12 that receives power from an AC power source 14. The control panel 12 powers and controls a plurality of notification appliances 22 connected by a two wire circuit 18a, 18b and a termination resistor 20. The control panel 12 may also receive power from a backup power supply 16. The control panel 12 provides power and control signals to synchronize operation of the notification appliances 22. While the example NAC 10 includes three notification appliances 22, other numbers of notification appliances could be utilized and contemplated with the context of this disclosure.

Each of the notification appliances 22 includes a power supply 24, a horn 26, a strobe 28 and a processor 44. Processor 44 may include a processing chip, microcontroller, microprocessor, or a collection of one or more of these. The horn 26 and the strobe 28 are controlled by the processor 44. It should be understood that although notification appliances 22 are disclosed by way of example, this disclosure will benefit any device that operates in a synchronized manner and that requires power back up to facilitate operation through power interruptions. Moreover, while each of the depicted notification appliances 22 include a common configuration, differently configured notification appliances could be provided as part of the NAC 10 and are within the contemplation of this disclosure.

Each of the plurality of notification appliances 22 in the NAC 10 are synchronized such that sound is emitted and light flashes at substantially the same time. Synchronization between the notification appliances 22 is required because random rapid high intensity flashes and loud horn sounds can generate confusion. Accordingly, operation of each notification appliance 22 is synchronized within a predetermined tolerance variation. In one example, 10 milliseconds variation between activation of strobes and horns of different notification appliances may be acceptable. The variation in synchronization originates in the departure from nominal values for each of the notification appliances 22 within the NAC 10. One source of synchronization variation is the time between the startup of each of the processor 44 and the initial input of power from the control panel 12.

Each processor 44 generates an initial reset used to set a beginning point for synchronization between each of the notification appliances 22. The initial reset is based on an initial input charge of a small capacitor (described below with reference to FIG. 2) reaching a predetermined level. Delay between the power input to each of the notification appliances 22 and the initial reset of each processor 44 is known as latency and variation in latency causes variation in any synchronization between the notification appliances 22. The range in variations in different notification appliances between the receipt of the input current and the initial reset creates uncertainty in the synchronization of the notification appliances 22. The amount of synchronization variation caused by latency reduces the amount of tolerance available to accommodate other causes of synchronization variation. For example, variances may be caused by differences in individual notification appliances 22, which may be caused by different component nominal working values. Moreover, environmental variations such as temperature can also contribute to the variable factors that are accommodated by the synchronization tolerance window.

It is desirable to continue operation in the event of a power interruption. It is also desirable to initially obtain a state where there is sufficient charge to operate processor 44. Because an energy store sufficient to power the appliance 22 cannot reach an adequate energy state to operate processor 44 in a desirable time frame, multiple energy stores are used, one small and capable of swift charging, and one larger, as described below.

Figure 2:
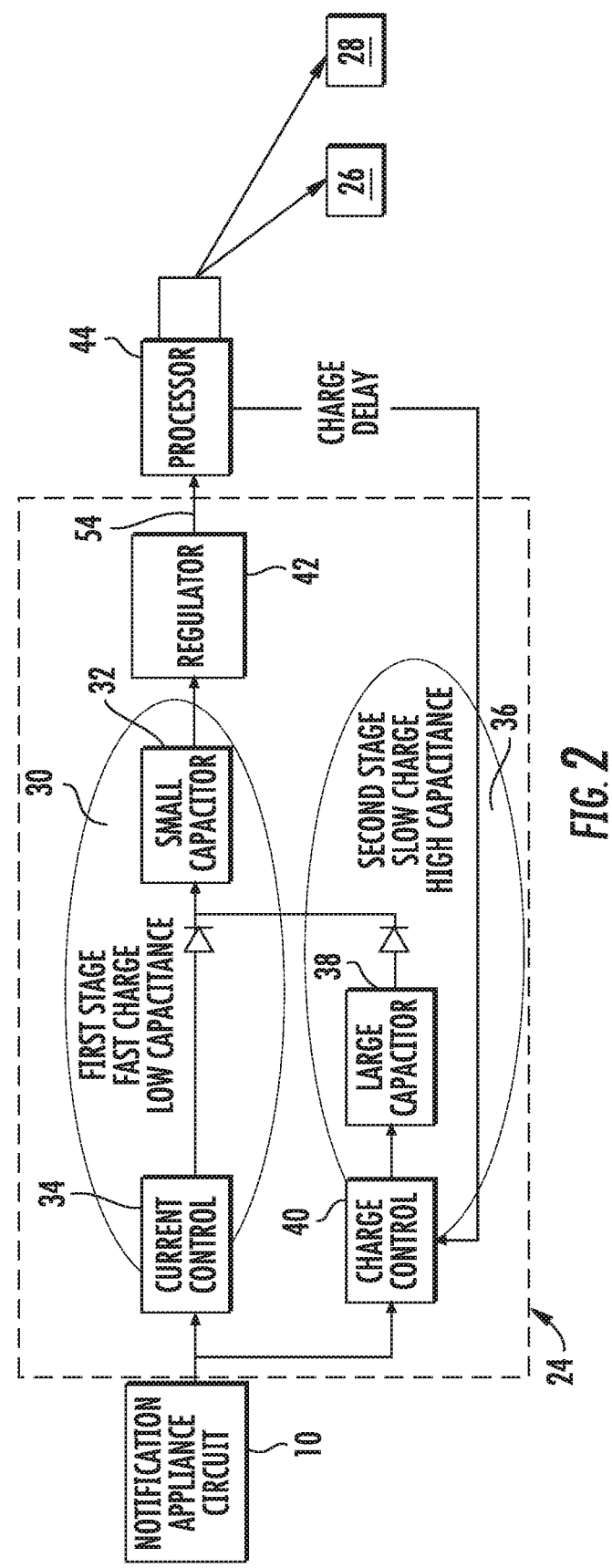
FIG. 2 is a block diagram of a power source for a notification appliance.

Referring to FIG. 2 with continued reference to FIG. 1, the power supply 24 for one of the notification appliances 22 is schematically illustrated and provides for improved certainty in the amount of latency between input power and the initial reset of the processor 44. Additionally, the example power supply 24 reduces the time for processor 44 to receive an input current 54 by supplying power to processor 44 from a first small capacitor 32. Therefore, the smaller capacitor 32 is first charged and input current is reduced to a minimum. The resulting quick charge of the first capacitor 32 reduces latency.

Regulator 42 provides power to the processor 44 and helps govern latency from a rising edge of the input power to the processor 44 and the initial reset of the processor 44. Regulator 42 may be, for example, a low-dropout voltage regulator or other voltage regulator. Regulator 42 transmits power to the processor 44 once the first capacitor 32 reaches a threshold charge level. The first capacitor 32 is relatively small and generates reduced latency but is not sufficient to power the processor through an extended power interruption. Accordingly, a second, larger, capacitor 38 is provided that includes a much larger energy storage capacity than the first capacitor 32. However, the second capacitor 38 is not charged until a time after the initial reset to allow the first capacitor 32 to reach sufficient charge to power the processor 44. It should be noted that the first capacitor 32 and the second capacitor 38 may alternatively be referred to as an energy stores within this disclosure.

The disclosed power supply 24 includes a first stage 30 that reduces latency and a second stage 36 that stores sufficient energy to power the processor 44 through an extended power interruption. The first stage 30 includes the first capacitor 32 that receives current through a current control 34 from the NAC 10. The first capacitor 32 is a relatively small capacitor 32 as compared to the second capacitor 38 and charges within a first charge time that is short relative to a second charge time of the second capacitor 38.

The second stage 36 includes a charge control 40 activated by the processor 44 that controls charging of the second capacitor 38. The second capacitor 38 is much larger than the first capacitor 32. In one example disclosed embodiment, the large second capacitor 38 includes an energy storage capacity that is between 10 and 1000 times larger than the energy storage capacity of the smaller first capacitor 32. In another example disclosed embodiment, the large second capacitor 38 has an energy storage capacity for storing energy that is between about 1000 and 10,000 times greater than the energy storage capacity of the smaller first capacitor 32. In one disclosed embodiment, the larger second capacitor 38 has an energy storage capacity of around 220 uF and the smaller first capacitor 32 has a capacity of about 2.2 uF for a ratio of 100 to 1. In another disclosed embodiment, the larger second capacitor 38 has a storage capacity of approximately 4700 uF and the first smaller capacitor 32 includes a storage capacity of approximately 2.2 uF for a ratio of approximately 2000 to 1.

In another disclosed embodiment, the second capacitor 38 includes an energy storage capacity that provides operation of the notification appliance for an extended power interruption. An extended power interruption is one that lasts for a duration that requires more power than is stored within the first capacitor 32. For example, an extended power interruption may last for about 100 milliseconds. In comparison, a power interruption of 10 milliseconds can be accommodated by the smaller capacitor 32. Thus, the larger second capacitor 38 will have a capability of powering the processor 44 through an interruption in power longer in duration as compared to the smaller first capacitor 32. For example, if the storage capacity ratio between the larger capacitor 38 and the smaller capacitor 32 is 100 to 1, than the second capacitor 38 will typically power the processor 44 for about 100 times longer than the first capacitor 32. It should be understood that the disclosed relative energy storage values are provided by way of example and other combinations of larger and smaller capacitors may be utilized and are within the contemplation of this disclosure.

The first capacitor 32 is chargeable from a low charge condition to a fully charged condition in the first charge time. The second capacitor 38 is charged from a low charge condition to a fully charged condition within the second charge time that is longer than the first charge time. In one disclosed example, the second charge time is approximately one second and provides operation for a power interruption of 100 milliseconds. It should be appreciated that although specific sizes and energy storage charging times are disclosed, other combinations of capacitors and other charge timings are within the contemplation of this disclosure. Accordingly, the first stage 30 provides a small, quickly charged capacitor 32 to reduce latency between the input current and reset of the processor 44. The latency is reduced because the small first capacitor 32 comes to charge quickly and thereby the input charge reaches a predetermined value quickly such that the processor 44 is not waiting for a larger size capacitor, sufficient to supply power through an extended interruption, to fully charge.

The second stage 36 provides for operation of the processor 44 during times of extended power interruption. The large capacitor 38 takes a longer period to charge but is not utilized to initiate the processor reset for synchronization purposes. Instead, the second stage 36 provides the separate function of storing energy for use during extended power interruption. Because powering the second stage 36 is not required to reset the processor 44, charging of the large capacitor 38 is delayed until the small capacitor 32 is fully charged and the processor 44 is powered.

Figure 3:
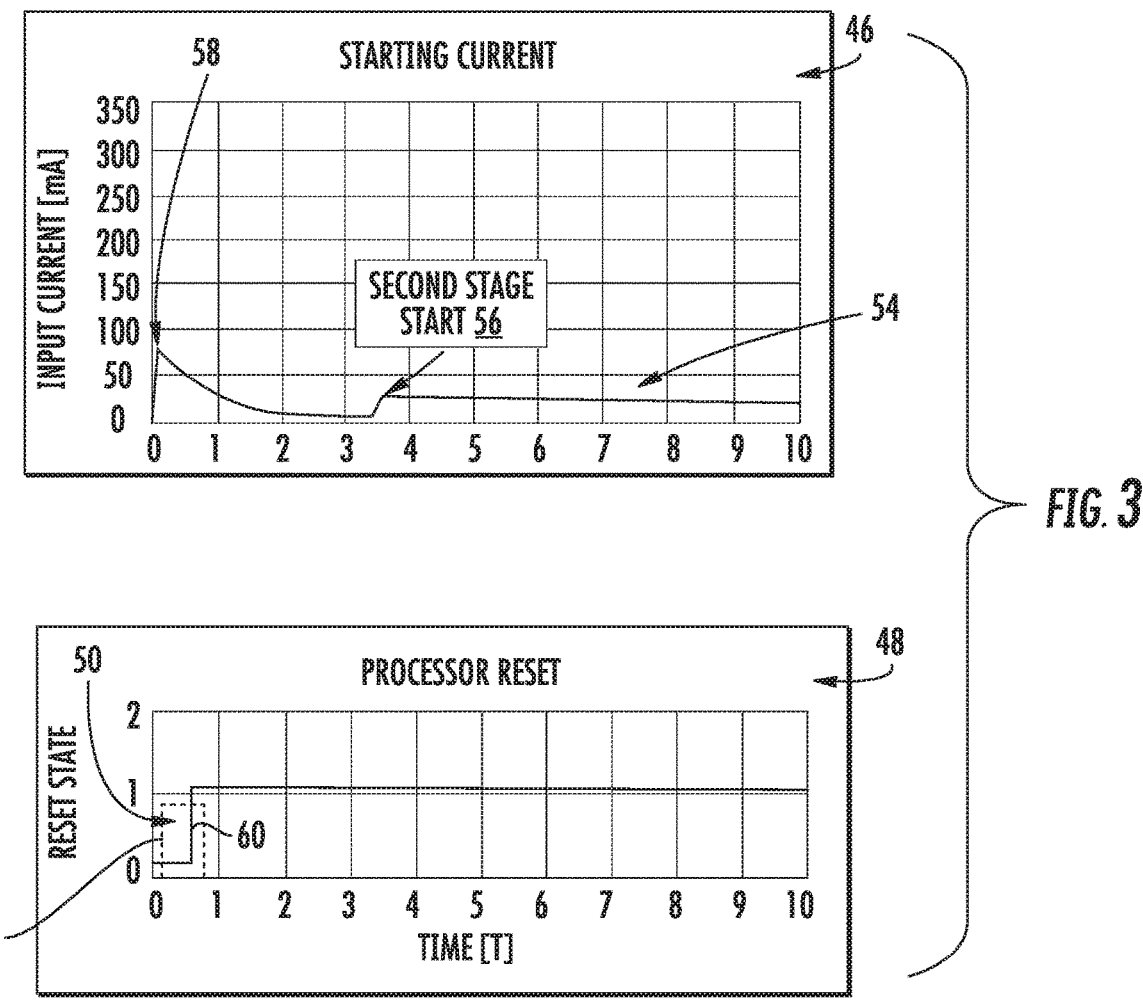
FIG. 3 is a graph illustrating starting current and reset time of an example processor of the notification appliance.

Referring to FIG. 3 with continued reference to FIGS. 1 and 2, a starting current graph 46 is illustrated that shows an input current 54 from the regulator 42 to the processor 44. Another graph 48 is illustrated that shows the time from the rising edge of input of current to the reset of the processor 44. Note that time "T" may be on the order of microseconds or milliseconds. The processor 44 is reset when the current 54 causes the charge level of the small capacitor 32 to reach a predetermined reset level at a time 60 shown schematically in graph 48. Current 54 begins charging the first capacitor 32 at a time 58, and completes charging the capacitor 32 at a time 56 shown schematically in graph 46. At this point the current which had been charging capacitor 32 drops and the charging of capacitor 38 commences, beginning at time 56 shown schematically in graph 46. Note that the time that the processor 44 is reset at time 60 and precedes the time that the first capacitor 32 is fully charged 56; the capacitor only needs to reach a certain level below full charge for the processor 44 to be operational at time 60. The time to the processor reset includes the latency 50 and uncertainty 52. Because the first capacitor 32 is charged quickly, input current 54 reaches the reset level quickly. Once the processor 44 is reset, a short delay is incurred until time 56 when charging of the large second capacitor 38 is initiated.

Operation of the example power supply 24 begins with the rising edge of the input current from the NAC 10 to start and synchronize the notification appliances 22. Upon the first receipt of input current, the small first capacitor 32 of the first stage 30 is charged. Because the small first capacitor 32 is relatively small, it charges quickly and provides current to the regulator 42 which in turn provides input current 54 to the processor 44. Once the processor 44 is reset, the notification appliance 22 is synchronized and begins operation. Operation may include emitting a sound with the horn 26 and flashes of light by the strobe 28 that are synchronized with other notification appliances 22 on the NAC 10.

After a short delay, to prevent superposition of current between the first and second stages 30, 36, the processor 44 will initiate charging of the second stage large capacitor 38 to at least a level where it will include sufficient electrical energy to power the notification appliance during a power interruption. The large capacitor 38 is in communication with the small capacitor 32 to provide energy to charge the small first capacitor 32 in the event of a power interruption.

The second stage large capacitor 38 may be a stand alone capacitor or it may also be part of others structures within the notification appliances such as for example, part of the strobe 28 and/or horn 26. Moreover, reducing the first stage capacitor 32 energy storage capacity enables the use of different capacitor technologies and materials that reduce cost and variation. For example, the reduced energy store capacity enables uses of different capacitor technologies that provide a significant reduction in tolerances. The reduced storage capacity enables the use of capacitors utilizing more stable materials such as a multi-layer ceramic with tolerances of about 10%. Additionally, the reduced storage capacity for the first stage capacitor reduces costs by a factor of two (2). The reduced cost of the first stage capacitor combined with the use of a large capacitor already present within the notification appliance further enables significant costs savings.

Accordingly, the disclosed example power supply 24 separates power requirements by providing the first stage 30 with the quickly charged smaller first capacitor 32 to reduce latency and the second stage 36 with the slower charging larger second capacitor 38 for powering the notification appliance 10 through extended power interruptions.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A power supply for a synchronized appliance comprising:
   a first energy store having a first energy storage capacity;
   a processor powered by energy from the first energy store; and
   a second energy store having a second energy storage capacity greater than the first energy storage capacity, wherein the processor initiates charging of the second energy store after a delay beginning at a time of receipt of a charge of predefined level from the first energy store.

2. The power supply as recited in claim 1, including a regulator receiving energy from the first energy store and communicating that energy to the processor.

3. The power supply as recited in claim 2, including a charge control governing charging of the second energy store.

4. The power supply as recited in claim 1, wherein a ratio of the second energy storage capacity to the first energy storage capacity is between 10 to 1 and 1000 to 1.

5. The power supply as recited in claim 1, wherein a ratio of the second energy storage capacity to the first energy storage capacity is between about 1000 to 1 and 10,000 to 1.

6. The power supply as recited in claim 1, wherein the first energy store charges to the first energy storage capacity within a first time and the second energy store charges to the second energy storage capacity within a second time that is longer than the first time.

7. The power supply as recited in claim 1, wherein the second energy storage capacity stores enough energy to operate the processor through an extended power interruption.

8. The power supply as recited in claim 1, wherein the second energy store charges the first energy store in response to an extended power interruption.

9. The power supply as recited in claim 1, wherein the processor governs operation of at least one of a horn and a strobe.

10. A notification appliance circuit (NAC) comprising:
    a plurality of notification appliances, wherein at least one of the plurality of notification appliances include a power source including:
      a first energy store having a first energy storage capacity;
      a processor powered by energy from the first energy store; and
      a second energy store having a second energy storage capacity greater than the first energy storage capacity, wherein the processor delays charging of the second energy store after a delay beginning at a time of receipt of a charge of predefined level from the first energy store; and
    circuit wiring connected to provide electric power to each of the plurality of notification appliances and synchronize operation of the plurality of notification appliances.

11. The notification appliance circuit (NAC) as recited in claim 10, including a regulator receiving energy from the first energy store and communicating that energy to the processor and a charge control controlled by the processor for governing charging of the second energy store.

12. The notification appliance circuit (NAC) as recited in claim 10, wherein a ratio of the second energy storage capacity to the first energy storage capacity is between 10 to 1 and 1000 to 1.

13. The notification appliance circuit (NAC) as recited in claim 10, wherein a ratio of the second energy storage capacity to the first energy storage capacity is about 1000 to 1 and 10,000 to 1.

14. The notification appliance circuit (NAC) as recited in claim 10, wherein the first energy store charges to the first energy storage capacity within a first time and the second energy store charges to the second energy storage capacity within a second time that is longer than the first time.

15. The notification appliance circuit (NAC) as recited in claim 10, wherein the second energy storage capacity stores enough energy to operate the processor through an extended power interruption.

16. The notification appliance circuit (NAC) as recited in claim 10, wherein the second energy store charges the first energy store during an extended power interruption.

17. The notification appliance circuit (NAC) as recited in claim 10, wherein at least one of the notification appliances include at least one of a horn and a strobe.

18. A method of powering notification appliances in a notification appliance circuit (NAC) comprising:
    charging a first energy store within the notification appliance with an input current from an NAC; and
    charging a second energy store within the same notification appliance after a delay period beginning at a time of receipt by a processor of the notification appliance of current at a predefined level from the first energy store.

19. The method as recited in claim 18, including setting a regulator start with a processor in response to receipt of charge at the predefined level.

20. The method as recited in claim 18, wherein the first energy store includes a first energy storage capacity that is charged in a first time and the second energy store includes a second energy storage capacity that charges in a second time, and the second energy storage capacity is greater than the first energy storage capacity and the second time is longer than the first time.

* * * * *